United States Patent
Chun

(10) Patent No.: US 7,885,187 B2
(45) Date of Patent: Feb. 8, 2011

(54) SYSTEM AND METHOD FOR PROVIDING UNIFIED MESSAGING SYSTEM SERVICE USING VOICE OVER INTERNET PROTOCOL

(75) Inventor: Joon-Sung Chun, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1839 days.

(21) Appl. No.: 10/996,375

(22) Filed: Nov. 26, 2004

(65) Prior Publication Data

US 2005/0157708 A1     Jul. 21, 2005

(30) Foreign Application Priority Data

Jan. 19, 2004     (KR)     ...................... 10-2004-0003942

(51) Int. Cl.
*H04J 1/16*     (2006.01)
(52) U.S. Cl. ........................ 370/231; 370/232; 370/356; 370/516
(58) Field of Classification Search ................. 370/412, 370/390, 401, 410, 352, 231, 232, 516, 356
See application file for complete search history.

(56) References Cited

U.S. PATENT DOCUMENTS

| | | | |
|---|---|---|---|
| 5,596,573 A | 1/1997 | Bertland | |
| 6,233,318 B1 | 5/2001 | Picard et al. | |
| 6,434,222 B1 | 8/2002 | Shaffer et al. | |
| 6,463,145 B1 | 10/2002 | O'Neal et al. | |
| 6,574,599 B1 | 6/2003 | Lim et al. | |
| 6,661,877 B1 | 12/2003 | Lee et al. | |
| 6,704,305 B2 | 3/2004 | Emerson, III | |
| 6,721,398 B1 | 4/2004 | Pitcher | |
| 6,748,054 B1 | 6/2004 | Gross et al. | |
| 6,748,056 B1 | 6/2004 | Capriotti et al. | |
| 7,426,221 B1* | 9/2008 | Cutaia | ........................ 370/516 |
| 2001/0009547 A1* | 7/2001 | Jinzaki et al. | ............... 370/390 |

(Continued)

FOREIGN PATENT DOCUMENTS

WO     WO 02/23319 A1     3/2002

(Continued)

OTHER PUBLICATIONS

Search Report under Section 17 issued by the British Patent Office in applicant's corresponding British Patent Application No. GB 0426328.1, (Apr. 21, 2005).

(Continued)

*Primary Examiner*—Fan Tsang
*Assistant Examiner*—Simon King
(74) *Attorney, Agent, or Firm*—H.C. Park & Associates, PLC

(57) ABSTRACT

A system and a method providing UMS services using VoIP (Voice over Internet Protocol), upon transmitting voice data to a VoIP gateway, a VoIP-UMS having a VoIP interface transmits the voice data in a burst mode using the UMS's characteristic of sending the voice data that has been already recorded, and the VoIP gateway receives voice data that will listen to a user, stores the voice data in a buffer in advance, and reproduces the voice data at constant intervals so that the user listens to the voice, thereby eliminating noises due to delay and jitter.

18 Claims, 5 Drawing Sheets

U.S. PATENT DOCUMENTS

| | | |
|---|---|---|
| 2002/0049817 A1 | 4/2002 | Drory et al. |
| 2003/0038708 A1 | 2/2003 | Lund |
| 2003/0074559 A1* | 4/2003 | Riggs .......................... 713/168 |
| 2003/0165231 A1 | 9/2003 | Singh et al. |
| 2010/0020823 A1* | 1/2010 | Bai et al. .................... 370/468 |

FOREIGN PATENT DOCUMENTS

| | | |
|---|---|---|
| WO | WO 02/091723 A1 | 11/2002 |

OTHER PUBLICATIONS

Zin Gang Wang, et al.; "Improving VoIP Application's Performance over WLAN Using a New Distributed Fair MAC Scheme"; 18th International Conference on Advanced Information Networking and Applications, 2004, IEEE, pp. 126-131 vol. 1.

* cited by examiner

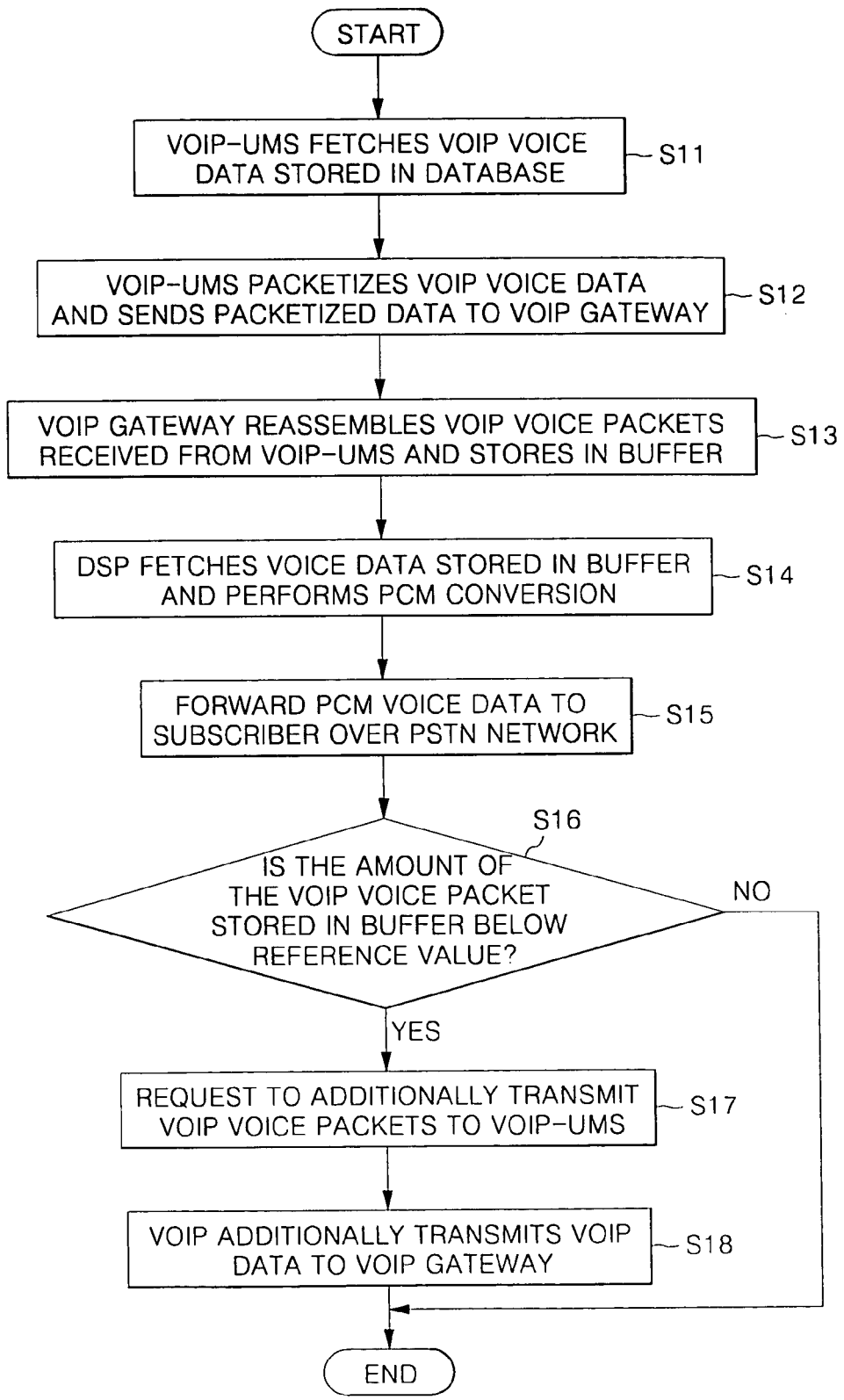

SYSTEM AND METHOD FOR PROVIDING UNIFIED MESSAGING SYSTEM SERVICE USING VOICE OVER INTERNET PROTOCOL

CLAIM OF PRIORITY

This application makes reference to, incorporates the same herein, and claims all benefits accruing under 35 U.S.C. §119 from an application for SYSTEM AND METHOD FOR PROVIDING UNIFIED MESSAGING SYSTEM SERVICE USING VOICE OVER INTERNET PROTOCOL earlier filed in the Korean Intellectual Property Office on 19 Jan. 2004 and there duly assigned Serial No. 2004-3942.

BACKGROUND OF THE INVENTION

1. Field of the Invention

The present invention relates to a system, a method and program storage device readable by a machine, tangibly embodying a program of instructions executable by the machine to perform the method of providing UMS service using VoIP for providing unified messaging system (UMS) service using a voice over Internet protocol (VoIP).

2. Description of the Related Art

A unified messaging system (hereinafter, referred to as "UMS") is an advanced technique based on existing E-mail and voice mail system (VMS) techniques and is a system designed to accommodate and collectively manage all media used in communications. It is also a system capable of collectively managing and operating automatic response system (ARS) service, VMS service, E-mail, facsimile (FAX) and the like in one system.

Accordingly, the UMS should include a public switched telephone network (PSTN) interface for a telephone network service, such as an automatic response system (ARS), a voice messaging system (VMS), a facsimile and the like, and an IP interface for connection to a packet network for an Internet messaging service, such as E-mail and the like.

In the public switched telephone network (PSTN) known as a telephone network, voice is generally delivered using pulse code modulation data or PCM data sampled at 64 kbps. Generally, in the voice communication, data is generated in real time and accordingly a method of transmitting the data should transmit the data in real time so that communication with a correspondent party listening to a relevant voice is smoothly made.

In the telephone network, such real time capability is always assured due to the characteristic of a circuit network that the network uses an allocated fixed bandwidth. The delay or loss of sound quality caused due to the limited bandwidth is always constant, and the users can communicate in the sound quality corresponding to PCM data of 64 Kbps.

Meanwhile, the development and rapid popularization of an Internet technique shifts a communication service base to an Internet base. A voice over Internet protocol (VoIP) is a technique for a series of equipment that delivers voice using an Internet data network. Therefore, there is an advantage that a variety of UMS services can be provided to all users connected to the Internet network when the UMS is implemented using the VoIP technique.

Generally, in the VoIP, voice information is transmitted in a digital form within discrete packets because the VoIP is not a traditional protocol based on a line like the PSTN. Thus, the introduction of a VoIP technique, which is a technique for transmitting the voice to the packet network, causes the loss of sound quality due to delay, jitter, and loss by the characteristic of the packet network. That is, there occurs a problem in that the distortion of the voice due to delay or loss becomes serious in view of characteristics of the packet network when PCM data is transmitted as it is in spite that the voice data should be transmitted in real time to a destination due to characteristics of the voice data. Consequently, the VoIP compresses and transmits the voice data at the rate of about 6.3 kbps or 8 kbps according to the type of a codec so that it is insensitive to the delay and loss of the packet to a certain degree.

However, there is also a problem in that the voice quality is further deteriorated due to the additional loss of the voice quality caused in the process of compressing the voice data to transmit the voice data to a packet network having a limited bandwidth.

SUMMARY OF THE INVENTION

It is therefore an object of the present invention to provide an improved system for providing UMS services using VoIP.

It is also an object of the present invention to provide an improved method for providing UMS services using VoIP.

It is also an object of the present invention to provide a system and method for providing UMS service using VoIP by which a voice service can be provided without the loss of sound quality due to delay, jitter and loss resulting from a VoIP technique upon performing the UMS service using the VoIP technique.

These and other objects may be achieved by a system for providing UMS service using VoIP according to the present invention for achieving this object, upon sending voice data to a VoIP gateway, a VoIP-UMS with a VoIP interface sends the voice data in a burst mode using the characteristic of the UMS of transmitting the voice data which has been already recorded, and the VoIP gateway can receive the voice data to be listened by a user, store the voice data in a buffer in advance, and then reproduce voice data at constant intervals so that the user listens to the voice, thereby eliminating noises due to delay and jitter.

The present invention pertains to a method of providing UMS service using VoIP, that includes transmitting, by VoIP-UMS, recorded VoIP voice packet data over a first network in a burst mode to provide voice service, and performing, by a VoIP gateway, data conversion processing with respect to the VoIP voice packet data at a fixed speed and to transmit the converted data over a second network to a subscriber after receiving the VoIP voice packet data transmitted from the VoIP-UMS and storing the data in a buffer. An interval and a size at which the VoIP voice packet data is transmitted to the VoIP gateway in the burst mode is determined in such a range that the VoIP voice packet data stored in the buffer of the VoIP gateway is not depleted below a reference value.

The present invention also pertains to a program storage device readable by a machine, tangibly embodying a program of instructions executable by the machine to perform a method for providing UMS service using VoIP, said method of providing UMS service using VoIP includes transmitting, by VoIP-UMS, recorded VoIP voice packet data over a first network in a burst mode to provide voice service, and performing, by a VoIP gateway, data conversion processing with respect to the VoIP voice packet data at a fixed speed and to transmit the converted data over a second network to a subscriber after receiving the VoIP voice packet data transmitted from the VoIP-UMS and storing the data in a buffer. An interval and a size at which the VoIP voice packet data is transmitted to the VoIP gateway in the burst mode is determined in such a range that the VoIP voice packet data stored in the buffer of the VoIP gateway is not depleted below a reference value.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein:

FIG. 6 is a flow chart showing a procedure in which voice data is processed in a VoIP-UMS and a VoIP gateway in the state where a call has been set up between the VoIP gateway and the VoIP-UMS according to the present invention.

DETAILED DESCRIPTION OF THE INVENTION

Figure 1:
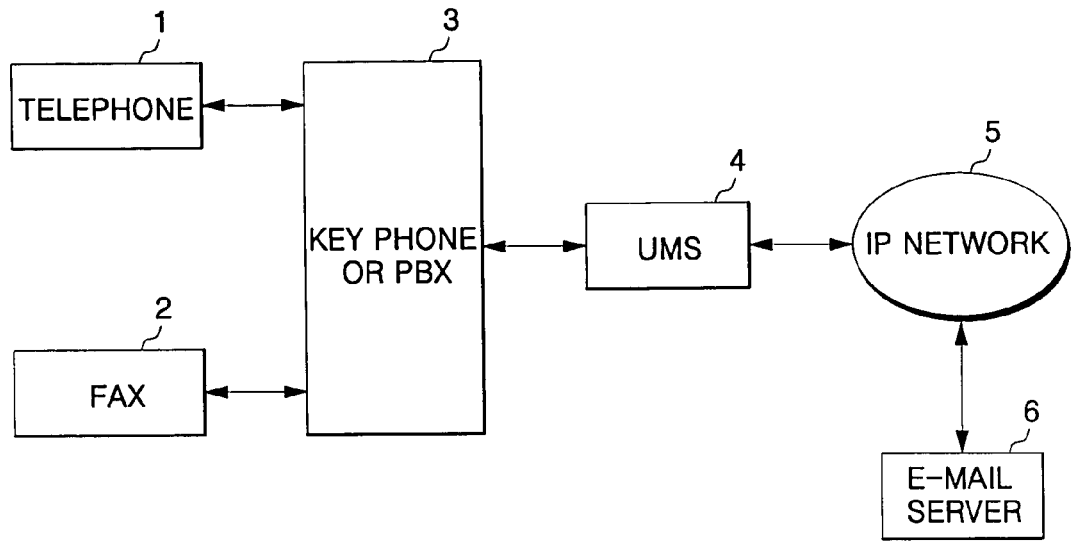
FIG. 1 is a block diagram illustrating a configuration of a system for providing UMS service.

Turning to the figures, FIG. 1 is a block diagram illustrating a configuration of a system for providing UMS service. Referring to FIG. 1, the system for providing UMS service is made up of a telephone 1, a facsimile 2, a key phone or private branch exchange (PBX) 3, a UMS 4, an E-mail server 6, and the like. Each of the telephone 1 and the facsimile 2 is a user terminal connected to an analog interface device in the key phone or PBX 3 to use the UMS service.

The key phone or PBX 3 is a private branch exchange device that performs an exchange function within a specific region, and may be connected to the UMS 4 through a digital line such as E1 or T1 or through an analog line such as foreign exchange station (FXS) or foreign exchange office (FXO). The UMS 4 has a PSTN interface and is connected to the key phone or PBX 3 to provide a variety of UMS services to the telephone 1 and the facsimile 2. The UMS 4 is also connected to the Internet over an IP network 5 to transmit packet data. The E-mail server 6 allows general users to transmit or receive E-mails through an Internet network 5. Here, it can be seen that the UMS 4 is primarily providing a voice service through the PSTN interface and an E-mail service through the IP interface.

Figure 2:
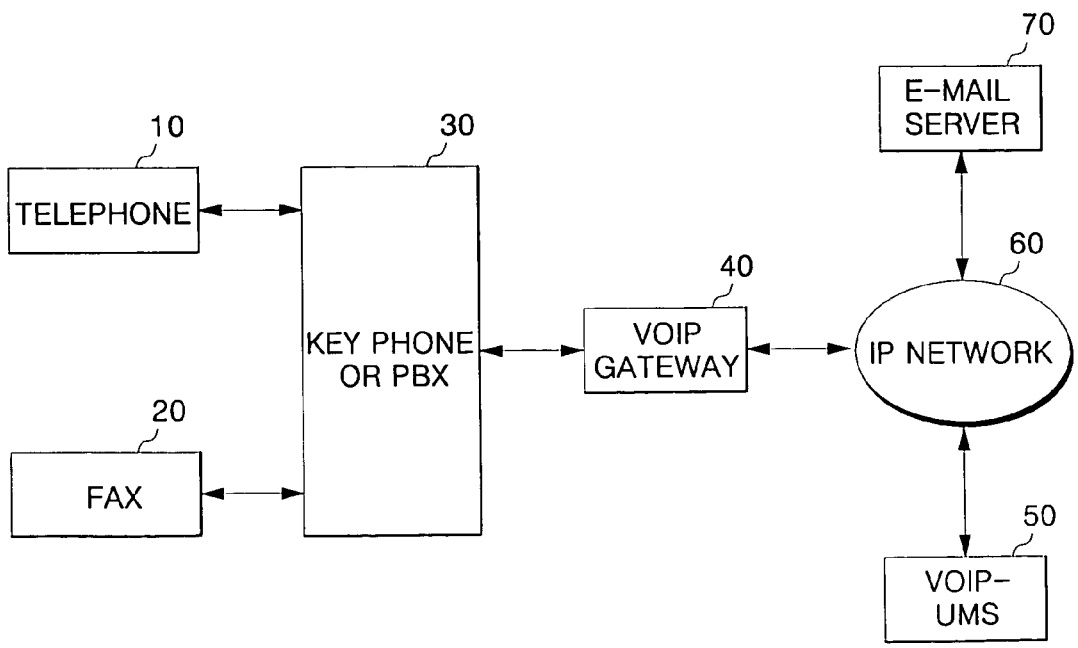
FIG. 2 is a block diagram illustrating a configuration of a system for providing UMS service using VoIP according to an embodiment of the present invention.

Turning now to FIG. 2, FIG. 2 is a block diagram illustrating a configuration of a system for providing UMS service using VoIP according to an embodiment of the present invention. The system for providing UMS service using VoIP according to an embodiment of the present invention is made up of a telephone 10, a facsimile (FAX) 20, a key phone or PBX 30, a VoIP gateway 40, a VoIP-UMS 50, and an E-mail server 70. Each of the telephone 10 and facsimile 20 is a user terminal connected to an analog interface device of the key phone or PBX 30 to use UMS service. The key phone or PBX 30 is a private branch exchange device that performs an exchange function in a specific region. The key phone or PBX 30 may be connected to the VoIP gateway 40 using either a digital line such as E1/T1 or an analog line such as FXS/FXO.

The VoIP gateway 40 is equipment that allows a VoIP network and a PSTN network to interwork with each other. Because the VoIP gateway 40 includes a compression codec therein, the VoIP gateway 40 can convert pulse code modulation or PCM data delivered from the key phone or PBX 30 into VoIP packets to transmit the converted VoIP packets to the packet network and, conversely, can convert the VoIP voice packets received from the VoIP-UMS 50 into PCM data and transmit the PCM data to a circuit network (i.e., PSTN network).

At this time, upon receiving and processing the VoIP voice packets from the VoIP-UMS 50, the VoIP gateway 40 does not receive and process a certain amount of voice packets per unit time like a typical VoIP service. Instead, the VoIP gateway 40 receives a sufficient amount of voice packets in a burst mode, stores the voice packet data in a buffer, performs PCM conversion processing by a certain (or fixed) amount of voice packets, and transmits the PCM data to the PSTN network so that the voice is provided in real time.

Naturally, the VoIP gateway 40 should include a PSTN interface such as FXS, FXO, E1, T1, primary rate interface (PRI) or the like to interwork with the circuit network and also include an IP interface capable of connecting the VoIP gateway to the IP network 60 such as an Internet to interwork with the Internet packet network.

The VoIP-UMS 50 is connected to the PSTN by interworking with the VoIP gateway 40 using VoIP techniques without the PSTN interface used to interwork with the telephone network in the UMS 4 of FIG. 1. The VoIP-UMS 50 is able to provide all services if it connects to the Internet network only. Meanwhile, the voice communication processed at the VoIP-UMS 50 is characterized in that a sound source is not generated in real time and that the data recorded previously is provided to a user, unlike a typical interactive voice communication.

Thus, the data can be transmitted to the VoIP gateway 40 in the burst mode rather than in real time as in a typical voice communication because the voice data generated in the VoIP-UMS 50 is the voice data that has been stored in the VoIP-UMS 50 in advance. By transmitting the voice data in the burst mode as mentioned above, the VoIP gateway 40 can receive a sufficient amount of voice packets, store the packet data in the buffer, perform PCM conversion by a certain amount of packets, and transmit the PCM data to the PSTN network so that the voice data is provided to a user without delay or jitter. Here, the VoIP gateway 40 can also perform flow control of the packets to prevent the voice data from being lost due to the loss of the packets.

Figure 3:
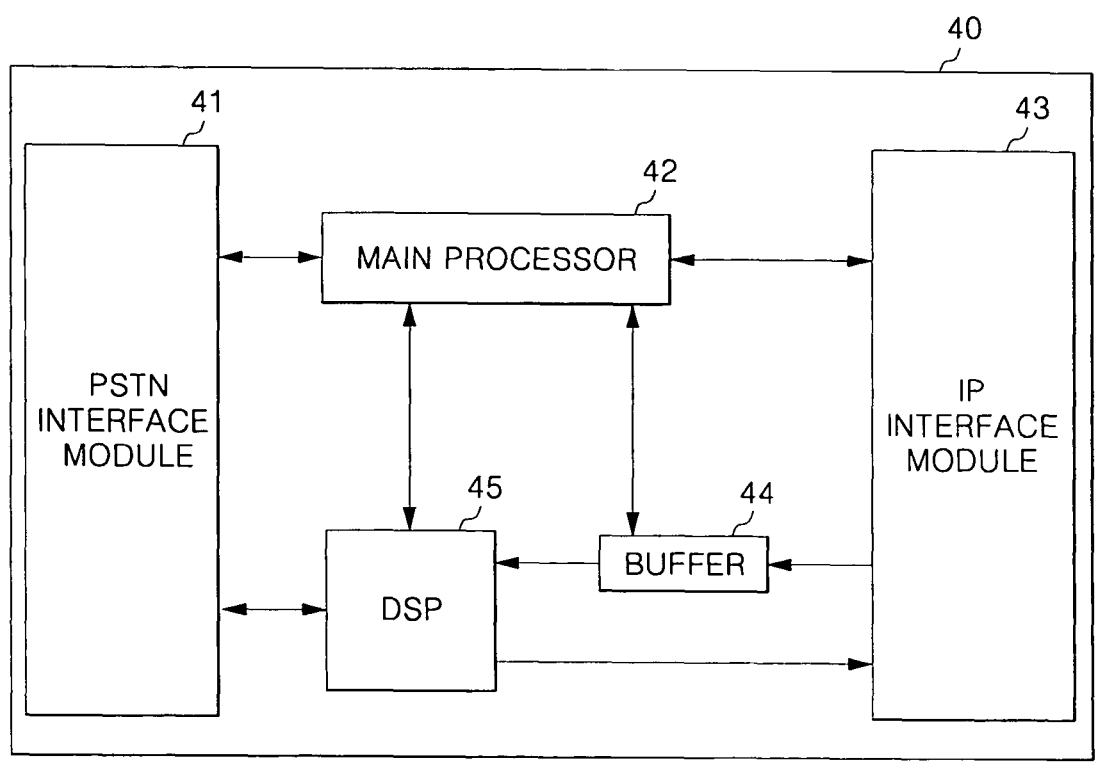
FIG. 3 is a block diagram illustrating a configuration of a VoIP gateway according to an embodiment of the present invention.

FIG. 3 is a block diagram illustrating a configuration of a VoIP gateway 40 according to an embodiment of the present invention. Referring to FIG. 3, the VoIP gateway 40 is made up of a PSTN interface module 41 for matching with a PSTN network, an IP interface module 43 for matching with the IP network, a main processor 42 for performing call processing of the PSTN interface module 41 and the IP interface module 43, a buffer 44 for receiving and storing the voice VoIP packet data transmitted from the VoIP-UMS 50 in a burst mode, through the IP interface module 43, and a DSP 45 for performing digital signal processing with respect to the voice VoIP packet data supplied from the buffer 44 and using a voice codec to restore voice PCM and outputting the voice PCM to the PSTN network through the PSTN interface module 41.

The PSTN interface module 41 may include either a digital line such as E1 or T1, or an analog line interface such as FXS or FXO. The E1 line provides a maximum of 30 channels. The foreign exchange station (FXS) may interwork with an analog office line in the key phone or PBX while the foreign exchange office (FXO) may interwork with an extension in the key phone or PBX.

Under the control of the main processor 42, the IP interface module 43 packetizes the data, which has been compressed into IP packets through the DSP 45, to transmit the packetized data to the VoIP-UMS 50 over the IP network, and reassembles the VoIP voice packet data transmitted from the VoIP-UMS 50 over the IP network and stores the resultant data in the buffer 44.

When receiving a subscriber's call connection request from the PSTN network, the main processor 42 performs an entire control over the VoIP gateway 40 to allocate a channel to the relevant subscriber, to store in the buffer 44 the VoIP voice data received in a burst mode from the VoIP-UMS 50 after setting up a call with the VoIP-UMS 50, and to restore the PCM data from the data stored in the buffer 44 through the DSP 45.

The main processor 42 may use either an H.323 protocol or an SIP protocol when performing VoIP communication with the VoIP-UMS 50. A case where the processor uses the SIP protocol will be herein discussed by way of example.

When connected to the VoIP-UMS 50 using the SIP protocol, the main processor 42 forwards an INVITE message and an INFO message to the VoIP-UMS 50 to make call setup. Here, the INFO message includes a call type, Real-Time Transport Protocol or RTP channel information, and a buffer size.

The RTP channel information is needed to make the call setup and includes the type of a codec for compressing RTP voice packets, an IP address for a RTP connection, user datagram protocol or UDP port information, and information on a transmission mode for the RTP voice packets. Here, the transmission mode for the RTP voice packets is either a real time transmission mode or a burst transmission mode, which will be selected to transmit the voice packets.

The buffer size information included in the INFO message indicates a buffer size corresponding to the channel allocated to the VoIP gateway 40. The buffer size determines a size of transmitted packets upon transmitting voice information from the VoIP-UMS 50 to the VoIP gateway 40 in a burst mode. The VoIP-UMS 50 determines a size of the packet whenever the packet is transmitted to the VoIP gateway 40 based on size information of the buffer included in the INFO message received from the VoIP gateway 40.

When the INVITE message or the INFO message from the VoIP gateway 40 arrives at the VoIP-UMS 50, the VoIP-UMS 50 determines whether a call is a direct type or a forward type, wherein the direct type means that the call is intended to connect to a subscriber's mail-box and the forward type means that the call is intended to connect a correspondent's mail-box. Then, if the call type is the direct, the VoIP-UMS 50 fetches voice messages stored in the relevant subscriber's mail-box and forwards voice packets having a size corresponding to the buffer size to the VoIP gateway 40 in a burst mode.

The VoIP gateway 40 receives the voice data from the VoIP-UMS 50 by a certain size in advance and stores it in the buffer 44 so that the buffer 44 always has at least a minimum amount of data in it at any given time. The DSP 45 can receive the voice data from the buffer 44 without delay, restore the VoIP packets data, and transmit the PCM data to the user's telephone 10 in real time.

In order that voice is reproduced without interruption upon transmitting the voice data in a burst transmission mode, the VoIP gateway 40 receives and stores the voice packets having a size equal to the full size of the buffer 44 for the first transmission, and receives and stores the transmitted packets equal to half the size of the buffer for subsequent transmissions, such that the buffer 44 never runs out of data.

Under the control of the main processor 42, the buffer 44 receives and stores the VoIP voice packets received from the VoIP-UMS 50 in a burst mode, through the IP interface module 43, and then transmits the stored data to the DSP 45 at constant intervals so that the DSP 45 converts the data into the PCM data in real time. The size of the buffer 44 becomes a factor that determines the amount of the packets transmitted from the VoIP-UMS 50 in a burst mode.

The amount of the VoIP packet data stored in the buffer 44 is controlled by the main processor 42. For example, the buffer 44 sends the VoIP packet data stored in the buffer 44 to the DSP 45 at constant intervals and, when the amount of the VoIP packet data stored in the buffer 44 decreases below an arbitrary reference value, the buffer 44 sends a trigger signal to the main processor 42 to enable the main processor 42 to request more VoIP voice packets from the VoIP-UMS 50.

Alternatively, the main processor 42 monitors the amount of the VoIP voice packet data stored in the buffer 44 at constant time intervals and, when the amount of voice packet data stored in buffer 44 is insufficient, main processor 42 requests more VoIP voice packets from the VoIP-UMS 50 so that the amount of the VoIP voice packet data stored in the buffer 44 is maintained at more than a certain amount.

In the VoIP gateway 40, the digital signal processor (DSP) 45 codes and compresses the PCM data received from the PSTN interface module 41 using for example G.723.1 or G.729, or restores the PCM data from the voice packets compressed for example using G.723.1 or G.729, which are received through the IP interface module 43, stored in the buffer 44 and then delivered. Consequently, the VoIP packet data inputted to the DSP 45 are restored into the PCM of 64 Kbps and the restored PCM data is transmitted through the PSTN interface module 41 to the key phone or PBX 30.

Figure 4:
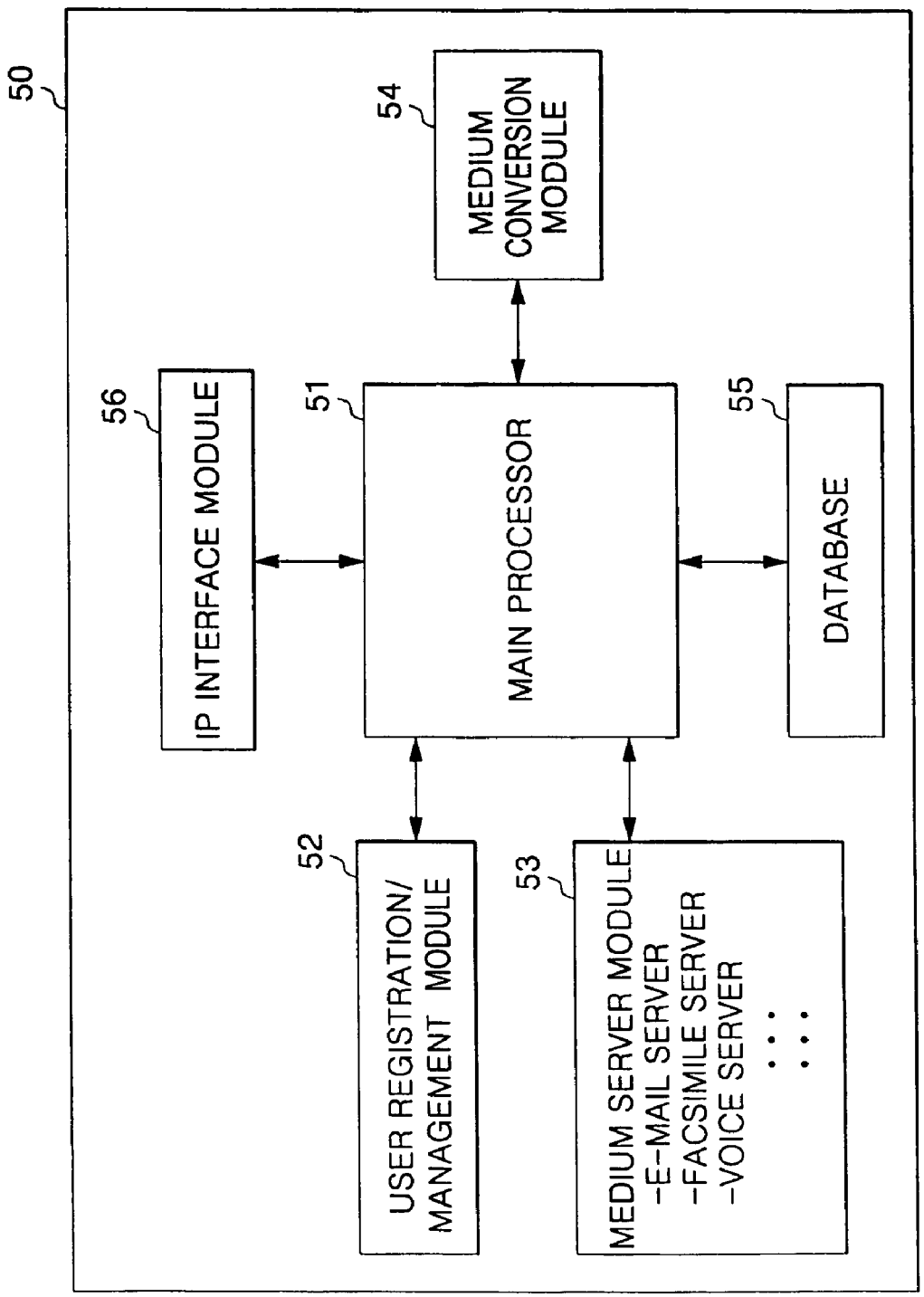
FIG. 4 is a block diagram illustrating a configuration of a VoIP-UMS according to an embodiment of the present invention.

FIG. 4 is a block diagram illustrating a configuration of VoIP-UMS 50 according to an embodiment of the present invention. Referring to FIG. 4, the VoIP-UMS 50 is made up of a user registration/management module 52 for receiving and managing user registration information and various service request information from UMS service users, a medium server module 53 in which a number of servers for services, such as E-mail, facsimile, mobile communication, wired communication network and the like, are configured in the form of sub-modules, a medium conversion module 54 converting data such as voice, facsimile, text and the like inputted by respective servers in the medium server module 53, a database 55 for storing various service data and user information, an IP interface module 56 matching the IP network for connection to the VoIP gateway 40, a main processor 51 for performing call connection and disconnection with the VoIP gateway 40 and transmitting the voice VoIP packet stored in the database 55 to the VoIP gateway 40 in a burst mode in response to a request from the VoIP gateway 40.

The main processor 51 sets up a call through VoIP communication with the VoIP gateway 40 through the IP interface module 56 using H.323 or session interface protocol or SIP, and transmits the voice data stored in the database 55 in the form of VoIP packets to the VoIP gateway 40. Upon fetching and transmitting the voice data that is compressed and stored in the database 55 in the form of the VoIP packets to the VoIP gateway, the main processor 51 may transmit the voice data either in a real time transmission mode or in a burst transmission mode.

The real time transmission mode samples and transmits the voice data at the same time that a user speaks, and means a transmission mode of transmitting data packets of a defined size per a certain time. That is, real time transmission mode will transmit in a packet unit through RTP per constant time intervals. For example, a G729 method sends data at a rate of 1000 bytes (i.e., 8000 bits) per a second, namely, 8 Kbps by periodically transmitting the data by 20 bytes per 20 msec.

This is, conceptually, to generate and transmit data in real time. There is also a method of grouping two or three packets and sending the packets at one time based on the concept such as a multi-frame transmission according to network states. This results in traffic reduction on the entire network, but an effect caused by delay or loss further increases when the traffic becomes increased.

The burst transmission mode is a transmission mode that does not transmit data per a certain time interval in a packet unit but transmits the VoIP packets at one time in a burst mode in view of the capacity that can be stored in the buffer 43 of the VoIP gateway. That is, the burst mode transmits the RTP voice data by a certain block size in a burst mode without delay. In other words, the burst mode transmits the data at one time where the data has a size not more than the buffer size included in the VoIP gateway 40.

It can be realized by the characteristic of the VoIP-UMS 50 that the voice data transmitted from the VoIP-UMS 50 to the VoIP gateway 40 is always voice data that has been already recorded. In the VoIP-UMS 50, the voice data, which will be provided through the VoIP gateway 40 to the user's telephone 10 and will be reproduced in real time, is transmitted to the VoIP gateway 40 in advance.

By transmitting the voice data from the VoIP-UMS 50 to the VoIP gateway 40 by a certain size in advance as described above, the voice data more than a certain amount is always buffered in the buffer 44 of the VoIP gateway 40 and thus the DSP 45 in the VoIP gateway 40 can receive the voice data without delay from the buffer 44, perform a restoring process on the VoIP packet data, and transmit PCM data to the user's telephone 10 in real time.

In order that the voice can be reproduced without interruption when the voice data is transmitted using the burst transmission mode, the voice packets are transmitted by the full size of the buffer 44 in the VoIP gateway 40 for a first transmission, and then by half the size of the buffer at subsequent transmissions so that under-run is not caused in the buffer 44 of the VoIP gateway 40 during voice reproduction and the data more than half the size of the buffer is always present in the buffer.

Further, in the real time transmission mode, when the packets are lost, there is no way capable of restoring the lost packets. This is because the reproduction of the relevant portion has been already completed as soon as flow control is performed to restore the lost packets, which makes packet retransmission to be meaningless. Accordingly, if the packets are lost in real time transmission mode, a user should inevitably listen to the voice distorted by the lost portions of the relevant packets.

However, since using the burst transmission mode allows the voice data to be sufficiently buffered in advance prior to voice reproduction, there is a temporal margin so that, when the packets are lost, the relevant packets can be retransmitted through the flow control. Consequently, in the burst transmission mode, it becomes possible to implement flow control enabling the VoIP gateway 40 to request the VoIP-UMS 50 retransmit lost packets when packets have been lost.

The user registration/management module 52 receives user registration information and various service request information from the VoIP-UMS service user and stores the information in the database 55. When there is a UMS service request from an arbitrary user, the user registration/management module 52 performs authentication to provide the UMS service to an authenticated user. The user registration/management module 52 will also perform all user managements, such as managing the capacity of voice mail-box, E-mail and the like available by the user depending on users' service grades and notifying to the user that set capacity is exceeded.

The medium server module 53 includes a number of servers configured in a form of sub modules to perform a variety of services of the VoIP-UMS, for example, E-mail service, facsimile service, voice mail-box service, a mobile communication network service, and wired communication network service.

Naturally, as shown in FIG. 2, the E-mail service may be provided solely through a separate E-mail server 70 connected over the IP network 60. Alternatively, the separate E-mail server 70 connected over IP network 60 may be implemented to provide an external additional E-mail service, which is provided independent of the E-mail service provided within the VoIP-UMS 50.

The medium conversion module 54 mutually converts data such as voice, facsimile, text and the like inputted by respective servers of the medium server module 53. When the user requests the data, the medium conversion module 54 converts the data stored in the database 55 to a format requested by the user by driving the relevant service server 53 and provides the converted data to the user.

The database 55 stores various service data and user information needed to perform the VoIP-UMS service. The user information includes user registration information and various service request information, which have been registered by the VoIP-UMS service user through the user registration/management module 52. The user information further includes authentication information for user authentication. An example of the authentication information may include passwords set by the users.

Under the control of the main processor 51, the IP interface module 56 interfaces numerous equipment on the Internet, which have been connected through the VoIP gateway 40 and the IP network. Further, the IP interface module 56 performs a function of packetizing the VoIP voice data stored in the database 55 and transmitting the packetized voice data to the VoIP gateway 40, and a function of reassembling the VoIP voice packet data incoming from the VoIP gateway 40 and transmitting the reassembled voice packet data to the main processor 51.

Figure 5:
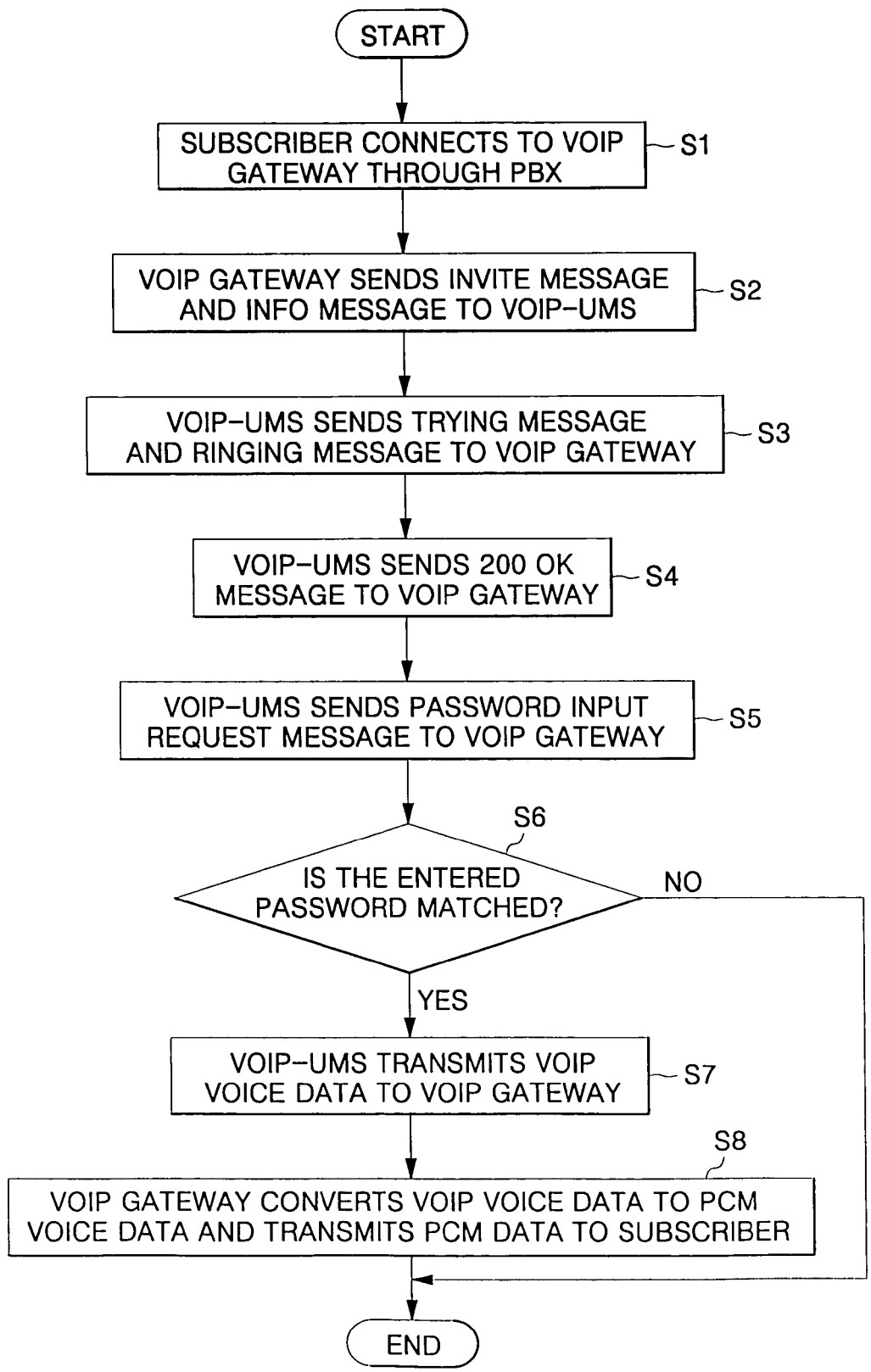
FIG. 5 is a flow chart showing a procedure in which a subscriber connects to a VoIP-UMS and listens to his or her voice mail-box message in a VoIP-system for providing UMS service according to the present invention.

FIG. 5 is a flow chart showing a procedure in which a subscriber is connected to a VoIP-UMS to listen to his or her voice mail-box message in the VoIP-system of FIG. 2 for providing UMS service as configured above. Referring to FIG. 5, the subscriber is connected to the VoIP gateway 40 through the PBX 30 by holding the telephone 10 and pressing a number (e.g., 3681) that is predefined to use his or her voice mail-box, in order to connect to the voice mail-box included in the VoIP-UMS 50 (S1).

The VoIP gateway 40 sends an INVITE message and an INFO message to the VoIP-UMS 50 to connect with the voice mail-box in the VoIP-UMS 50 (S2). The VoIP-UMS 50 sends a trying message and a ringing message to the VoIP gateway 40 in response to the INVITE message (S3). In addition, the VoIP-UMS 50 sends 200 OK as a signal indicating that a call connection is successful after retrieving subscriber information (S4).

If a communication path is established, the VoIP-UMS 50 sends an announcement saying "enter your password" to the VoIP gateway 40 (S5). The gateway delivers this announcement to the subscriber's telephone 10 through the key phone or PBX. When the subscriber enters his or her password, the VoIP-UMS 50 performs authentication on the entered password (S6) and, when the entered password matches to a predefined password, transmits voice data stored in the relevant subscriber's voice mail-box to the VoIP gateway 40 in a burst mode (S7). The VoIP gateway 40 converts the VoIP voice packet to the PCM data and then transmits the PCM data to the subscriber through the key phone or PBX (S8). The subscriber will listen to the voice data through the telephone 10, which is delivered through the key phone or PBX in real time after being converted from the VoIP voice packets to the PCM data in the VoIP gateway 40.

Turning to FIG. 6, FIG. 6 is a flow chart showing a procedure in which voice data is processed in a VoIP-UMS and a VoIP gateway of FIG. 2 in a state where a call has been set up between the VoIP gateway and the VoIP-UMS. Referring to FIG. 6, the main processor 51 fetches the voice data stored in a relevant subscriber's voice mail-box from the database 55 in order to forward the voice data through the call set up with the VoIP gateway 40 using the H.323 or SIP via the IP interface module 56 (S11).

At this time, since the voice data stored in the database 55 is stored in a form of VoIP voice packets, the main processor 51 forwards the voice data fetched from the database 55 to the IP interface module 56. The IP interface module 56 packetizes the VoIP voice data delivered from the database 55 and sends the packetized data to the VoIP gateway 40 over the IP network in a burst mode (S12). At this time, the transmission of the packetized data in the burst mode means continuously packetizing the voice data stored in the database 56 to transmit the packetized data to the VoIP gateway 40 until there is a separate blocking signal from the main processor 51 through the call set up with the VoIP gateway 40.

Meanwhile, the VoIP gateway 40 receives the VoIP packets, which are transmitted from the VoIP-UMS 50 over the IP network in the burst mode, through the IP interface module 43. The IP interface module 43 reassembles the VoIP voice packets received over the IP network and delivers the reassembled voice packet data to the buffer 44 over an internal bus (S13). The buffer 44 stores the VoIP voice packet data delivered from the IP interface module 43. The buffer 44 outputs the stored VoIP voice packet data to the DSP 45 at constant intervals in response to a request from the DSP 45. At this time, because the amount of the VoIP voice packet data that will be received by the buffer 44 is delivered from the VoIP-UMS 50 in view of the buffer size 44, the buffer 44 only needs to store the VoIP voice packet data whenever receiving the VoIP voice packet data through the IP interface module 43. In addition, the operation of storing in the buffer 44 the VoIP voice packet data received through the IP interface module 43 is not performed at constant intervals but is performed whenever the packet is transmitted from the VoIP-UMS 50 in the burst mode.

The DSP 45 fetches the VoIP voice packet data stored in the buffer 44 and performs digital processing through the voice codec on the VoIP voice packet data to restore (or convert to) the PCM data (S14). The DSP 45 fetches the VoIP voice packet data from the buffer 44 at a certain speed in conformity with the speed of restoring the PCM data by performing the digital processing through the voice codec. Thus, the DSP 45 can process the voice in real time by fetching and processing the voice data from the buffer 44 at constant intervals, such that the voice is reproduced without interruption.

After fetching the VoIP voice packet data from the buffer 44 at constant intervals and restoring to the PCM voice data, the DSP 45 delivers the PCM voice data to the PSTN interface module 41 over the internal bus. The PSTN interface module 41 delivers the relevant PCM voice data to the key phone or PBX 30 over the PSTN network, and the key phone or PBX 30 forwards the relevant voice data to the relevant subscriber's telephone 10 (S15).

Meanwhile, the main processor 42 monitors the amount of the VoIP voice packet data stored in the buffer 44 and, when the amount of the VoIP voice packet data stored in the buffer 44 becomes less than a certain reference value, for example, half the full size of buffer 44, the main processor 42 requests more VoIP voice packets from the VoIP-UMS 50 (S16 and S17). In response thereto, the main processor 51 in the VoIP-UMS 50 fetches the relevant VoIP voice packets from the database 55 and sends them to the IP interface module 56, and the IP interface module 56 packetizes the VoIP voice packets delivered from the database 55 and transmits the packetized voice packets to the VoIP gateway 40 over the IP network (S18).

As described above, in the embodiment, the main processor 42 in the VoIP gateway 40 monitors the amount of the VoIP voice packet data stored in the buffer 44 and requests more VoIP voice packets from the VoIP-UMS 50, so that under-run does not occur in the buffer 44 during voice reproduction in the DSP 45 and the buffer 44 is always at least half full with VoIP packet data waiting for conversion to PCM voice data.

However, the main processor 51 in the VoIP-UMS 50 may control the transmission of the VoIP voice packets independent of the operation in which the main processor 42 in the VoIP gateway 40 monitors the amount of the VoIP voice packet data stored in the buffer 44 and requests the VoIP voice packets from the VoIP-UMS 50. That is, the main processor 51 in the VoIP-UMS 50 sends the voice packets equal to the full size of the buffer 44 in the VoIP gateway 40 when transmitting the VoIP voice packets to the VoIP gateway 40 for a first transmission, and after estimating a time period during which the VoIP voice packets are reproduced, sends the VoIP voice packets of a certain size in a burst mode when the estimated time period has elapsed. For example, by sending the packets by half the size of the buffer at subsequent transmissions following the first transmission, depletion of data in the buffer 44 of the VoIP gateway 40 is prevented during the voice reproduction, and the buffer 44 is always at least half full with data.

By the VoIP-UMS 50 sending the voice data of a certain size to the VoIP gateway 40 in advance as stated above, the voice data more than a certain amount is always buffered in the buffer 44 of the VoIP gateway 40, and the DSP 45 in the VoIP gateway 40 can receive the voice data from the buffer 44 without delay, perform a restoring process on the VoIP packet, and transmit the PCM data to the user's telephone 10 in real time without interruption.

Further, the IP interface module 43 in the VoIP gateway 40 may check frame checking sequences or FCS of each of the VoIP voice packets transmitted from the VoIP-UMS 50 in a burst mode, and request to retransmit the lost packets from the VoIP-UMS 50 when any packet loss is found. Even though the IP interface module 43 in the VoIP gateway 40 requests retransmission of lost packets from the VoIP-UMS 50, the DSP 45 may fetch the VoIP voice packet data from the buffer 44 at constant intervals and then reproduce the voice independent of the retransmission request operation in the IP interface module 43 to perform real time voice reproduction.

As described above, in the present invention, upon sending the voice data to the VoIP gateway, the VoIP-UMS with the VoIP interface sends the voice data in a burst mode using the characteristic of the UMS of sending voice data already recorded. By doing so, the VoIP gateway can buffer the voice data in advance and then reproduce the buffered voice data at constant intervals to allow a user to listen to the voice data, instead of receiving and processing the voice data to be listened by the user in real time, thereby eliminating noises due to delay and jitter.

Further, noises resulting from packet loss could not be eliminated when the UMS sends the voice data to the VoIP gateway in real time. However, when the voice data is transmitted in advance, there occurs some margin between a data receiving time and a relevant data reproducing time, and accordingly the lost voice packets can be retransmitted in the margin time period, so that it is possible to effectively eliminate the noises due to the packet loss.

While this invention has been particularly illustrated and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined by the appended claims.

What is claimed is:

1. A system, comprising:
   a Voice over Internet Protocol-Unified Messaging System (VoIP-UMS) configured to transmit recorded VoIP voice packet data over a first network in a burst mode to provide voice service; and
   a VoIP gateway configured to:
      receive the VoIP voice packet data from the VoIP-UMS over the first network,
      store the VoIP voice packet data in a buffer,
      perform data conversion with respect to the stored VoIP voice packet data, and
      transmit the converted data to a subscriber over a second network.

2. The system of claim 1, wherein the VoIP gateway comprises:
   a first network interface module configured to match with the first network;
   a second network interface module configured to match with the second network;
   a main processor configured to perform call processing of the first network interface module and the second network interface module;
   said buffer configured to receive and store the VoIP voice packet data transmitted from the VoIP-UMS; and
   a digital signal processor (DSP) configured to:
   perform digital signal processing with respect to the stored VoIP voice packet data using a voice codec, and
   output the processed data to the subscriber through the second network interface module, the VoIP voice packet data being supplied from the buffer.

3. The system of claim 2, the main processor being configured to:
   monitor the amount of the VoIP voice packet data stored in the buffer at constant intervals, and when the amount of the voice packet data stored in the buffer is below a reference value, maintain the amount of the VoIP voice packet data stored in the buffer to more than a certain amount by requesting more VoIP voice packets from the VoIP-UMS.

4. The system of claim 3, the buffer being configured to send a trigger signal to the main processor to enable the main processor to request more VoIP voice packets from the VoIP-UMS when the amount of the VoIP voice packet data stored in the buffer decreases below said certain amount.

5. The system of claim 1, wherein in performing a call setup with an arbitrary VoIP gateway, the VoIP-UMS is configured to determine whether to use a real time transmission mode in which the VoIP voice packets are transmitted at constant intervals or to use a burst transmission mode in which the VoIP voice packets are transmitted in the burst mode in order to send the VoIP voice packets stored in the VoIP-UMS to the relevant VoIP gateway.

6. The system of claim 1, wherein the VoIP-UMS is configured to transmit the VoIP voice packet data based on a size of the buffer in the VoIP gateway for a first transmission and is configured to transmit the an amount of VoIP voice packet data corresponding to half the size of the buffer for subsequent transmissions.

7. The system of claim 1, wherein the VoIP-UMS comprises:
   a database configured to store VoIP voice data and user information for UMS service;
   a first network interface module configured to match with the first network to connect the VoIP-UMS to the VoIP gateway; and
   a main processor programmed and configured to:
      perform call connection and disconnection to the VoIP gateway, and
      send the VoIP voice packets comprising the VoIP voice data stored in the database to the VoIP gateway in the burst mode in response to a request from the VoIP gateway.

8. The system of claim 7, wherein the VoIP-UMS further comprises:
   a user registration/management module configured to receive user registration information and various service request information from UMS service users to manage the information;
   a medium server module comprising at least two servers configured to UMS service, the at least two servers being configured in a form of sub modules; and
   a medium conversion module configured to perform mutual conversion of data inputted by respective servers of the medium server module.

9. The system of claim 8, wherein the medium server module comprises a server module configured to provide a service selected from the group consisting of E-mail, facsimile, mobile communication, and wired communication network services.

10. The system according to claim 1, the first network being an Internet network and the second network being a telephone network.

11. A method of providing UMS service using VoIP, comprising:
   transmitting, by Voice over Internet Protocol-Unified Messaging System (VoIP-UMS), recorded VoIP voice packet data over a first network in a burst mode to provide voice service; and
   performing, by a VoIP gateway, data conversion processing with respect to the VoIP voice packet data at a fixed speed and transmitting the converted data over a second network to a subscriber after receiving the VoIP voice packet data transmitted from the VoIP-UMS and storing the VoIP voice packet data in a buffer.

12. The method of claim 11, further comprising, upon performing a call setup with an arbitrary VoIP gateway, determining, by the VoIP-UMS, whether to use a real time transmission mode in which VoIP voice packets are transmitted at constant intervals or to use a burst transmission mode in which the VoIP voice packets are transmitted in the burst mode.

13. The method of claim 11, wherein an interval and a size at which the VoIP voice packet data is transmitted to the VoIP gateway in the burst mode is determined such a that an amount of the VoIP voice packet data stored in the buffer of the VoIP gateway is not depleted below a reference value.

14. The method of claim 13, wherein transmitting the VoIP voice packet data to the VoIP gateway in the burst mode comprises transmitting, in a first transmission, a first amount of VoIP voice packet data based on a size of the buffer in the VoIP gateway, and after an estimated time period has elapsed, transmitting a second amount of VoIP voice packet data of a fixed size in subsequent transmissions, the estimated time period being a time period for processing the VoIP voice packets in the VoIP gateway.

15. The method of claim 14, wherein the fixed size corresponds to a size of half the size of the buffer.

16. The method according to claim 11, wherein said transmitting, by the VoIP gateway, the converted data over the second network to the subscriber comprises:

reassembling the VoIP voice packet data received from the VoIP-UMS and storing the reassembled VoIP voice packet data in the buffer;

fetching the VoIP voice packet data stored in the buffer at constant intervals;

performing digital signal processing on the fetched VoIP voice packet data using a voice codec; and outputting the resultant voice to the subscriber over the second network.

17. The method of claim 11, further comprising monitoring, by the VoIP gateway, the amount of the VoIP voice packet data stored in the buffer and, when the amount of the VoIP voice packet data stored in the buffer decreases below a reference value, requesting more VoIP voice packets from the VoIP-UMS and storing data from the requested VoIP voice packets in the buffer so that the amount of the VoIP voice packet data stored in the buffer is maintained at more than a fixed amount.

18. The method of claim 11, wherein the first network is an Internet network and the second network is a telephone network.

* * * * *